April 4, 1961 H. C. J. FOCKE 2,978,039
AIRCRAFT PROPELLERS FOR COMBINED AIRPLANE-HELICOPTER
FLYING MACHINES
Filed May 1, 1958 2 Sheets-Sheet 1

INVENTOR
HENRICH CARL JOHANN FOCKE

BY Toulmin & Toulmin

ATTORNEYS

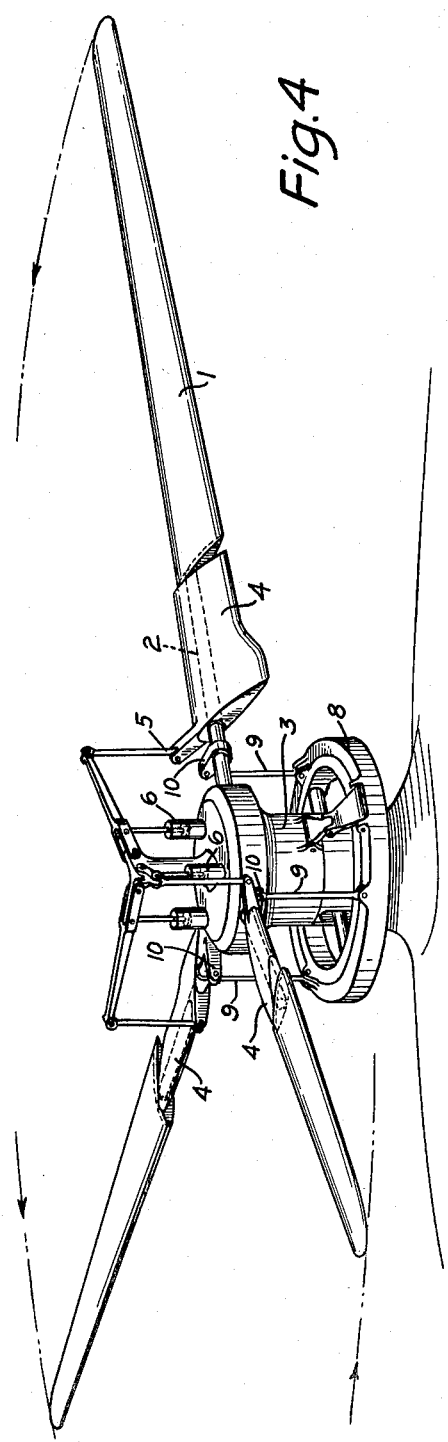
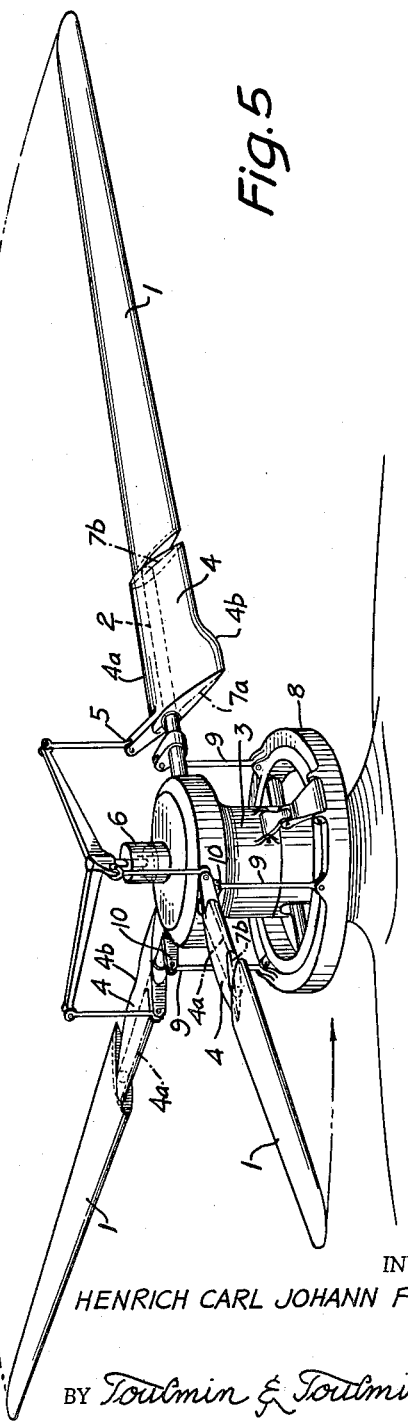

United States Patent Office 2,978,039
Patented Apr. 4, 1961

2,978,039

AIRCRAFT PROPELLERS FOR COMBINED AIRPLANE-HELICOPTER FLYING MACHINES

Henrich Carl Johann Focke, Sao Jose dos Campos, Sao Paulo, Brazil

Filed May 1, 1958, Ser. No. 732,386

4 Claims. (Cl. 170—160.25)

The present invention relates to an improvement in a propeller for a combined airplane-helicopter flying machine i.e. a machine designed for both rapid forward flight and vertical or substantially vertical climbing.

This application is a continuation-in-part of my co-pending application Serial Number 411,502, filed February 19, 1954, now abandoned.

In a propeller, designed for rapid forward flight, the blades necessarily have a large angle of twist between root and tip, this angle usually being about 40°. It is not feasible to adapt a propeller of this kind for operation as a helicopter propeller simply by pitch variation, because, in view of the large angle of twist, upon angular adjustment of the blades to reduce the pitch, the outer portions would get a too small angle of attack (and possibly a negative angle of attack), whereas the angle of attack of the blade portions adjacent the hub might still be too large.

Furthermore, it is a known fact that the inner portion of a propeller blade, i.e. the portion nearest the hub, only participates in the creation of the thrust to a small degree and has the drawback of producing strong eddy-currents. Thus it would be advisable to omit this inner portion, that is to say, the inner end of the propeller blades beginning at some distance from the hub.

In view thereof it has already been proposed to subdivide the propeller blades in transverse direction, and so design the mechanism for adjusting the blades, that the outer blade portions are adjusted through a smaller angle than the inner portions. This, however, involves a complicated construction of adjusting means.

Previously, it has been generally believed that since the inner portion of a propeller blade which has a streamlined shape participates in the creation of the thrust only to a relatively small degree, and that it is liable to produce strong eddies when its pitch is being altered, it would be preferable to give these inner blade portions such a shape that the portions do not participate in the aerodynamic operation of the blade. Since ineffective air resistance should be avoided, it is undesirable to form such portions as circular rods or shafts extending from the hub to the inner ends of the blades proper, which would then begin at some distance from the hub. If the inner portion of the blade shaft between the blade and the hub were, for instance, a circular rod, it would increase considerably the air resistance.

It is therefore the principal object of this invention to provide for an improved propeller adapted to be used in a combined airplane-helicopter flying machine.

It is the particular object of the present invention to provide for an improved propeller of variable pitch offering a minimum of undesirable air resistance during both forward and upward flight.

These objects and advantages are achieved by the present invention by providing each propeller blade with a portion of air foil cross section adjacent the hub, which portion is freely rotatable about its longitudinal axis. Thus, it may consist of an envelope freely rotatable about said longitudinal axis and having a cross section substantially similar to that of a propeller blade. If this envelope is of uniform streamlined cross section throughout its length, it will adjust itself in the manner of a wind vane in which the center of wind pressure lies behind the longitudinal axis of its shaft. It is therefore a main feature of the invention that the profile of said blade portion adjacent the hub is of such shape that the center of pressure falls behind said longitudinal axis. Thereby the envelope, due to its aerodynamic or air foil cross section adjusts its position automatically under the effect of the air current attacking its surface to the momentary direction of flow of the air.

Provision should preferably be made to prevent free fluttering of such envelope. This result is attained in this invention by connecting this envelope to means for damping its angular movements about said axis. These means are either common for the envelopes of all the blades of a propeller or separate for each blade.

The invention provides that, notwithstanding the free rotatability of the inner blade portion or envelope, at least part thereof is utilized in the creation of propeller thrust, by making that part of such portion or envelope adjacent to the blade tip of such shape that it has its center of pressure accurately or approximately located upon the axis of rotation to the blade while, according to the aforesaid main feature of the invention the remaining part of the inner blade portion has its center of pressure located behind said axis. Thus it has been found that in spite of previous beliefs that any thrust or lift achieved by the inner blade portion should be sacrificed in favor of decreased drag, it is possible to obtain some thrust or lift notwithstanding the small energy and drag losses in the inner blade portion. This invention therefore reduces the air resistance caused by too great angles of incidence of the inner blade portion but enables thrust to be produced.

This is achieved by providing the aforesaid propeller blade portions with a streamlined surface having a variable chord at right angles to the longitudinal rotary axis of the portion and varying said chord in such a way from the end surface of the portion facing the tip to the end surface of the portion facing the hub of the propeller that while the points of the streamlined surface being most advanced in the forward direction of the rotary movement of the propeller around said hub form a straight leading edge parallel to the above-mentioned longitudinal rotary axis, the trailing edge of the streamlined surface of said portion, i.e. the rearward edge relative to the rotary movement of the propeller is forming a curve beginning at a shorter distance from the aforesaid leading edge at the end surface of said portion facing the propeller top and ending at a larger distance from the aforesaid leading edge at the end surface of the portion facing the hub.

Thus, the automatic adjustment of the inner portion of the blade is effected by that part of the portion facing the hub which part does not participate in the creation of thrust but avoids air resistance by its streamlined cross section and due to the fact that its center of pressure lies behind the longitudinal axis of the shaft, while that part of the inner portion facing the tip of the blade and having its center of pressure substantially on the longitudinal axis of the shaft, participates in the creation of the propeller thrust because it will have an angle of incidence against the air flow and no torque about the blade axis is set up to change its blade angle.

The invention will hereinafter be described with reference to the accompanying drawings, in which:

Figure 4 shows a perspective view of a propeller comprising three propeller blades mounted on a hub and provided with damping means for damping the angular movement of each of the rotary blade portions separately.

Figure 5 shows a perspective view of a propeller comprising three propeller blades mounted on a hub and provided with a single damping means for simultaneously damping the angular movements of the rotary blade portions of the three propeller blades.

The propeller blade shown in these figures consists of an aerodynamically profiled outer portion 1 attached to a shaft 2 which, by means of the usual blade adjusting means arranged within the hub, may be angularly adjusted for varying the pitch of the outer portion of the propeller.

The remaining portion of the propeller blade adjacent the hub consists of a separate aerodynamically shaped envelope 4 which is freely rotatable about the shaft 2.

Figure 1:
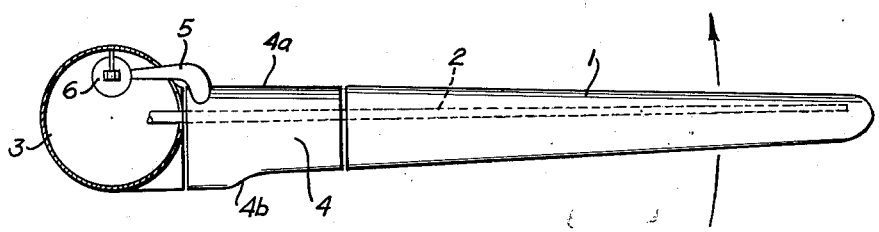
Figure 1 is a diagrammatic front elevation of a propeller blade according to the invention, as seen in a transverse cross section through the hub.
Figure 2:
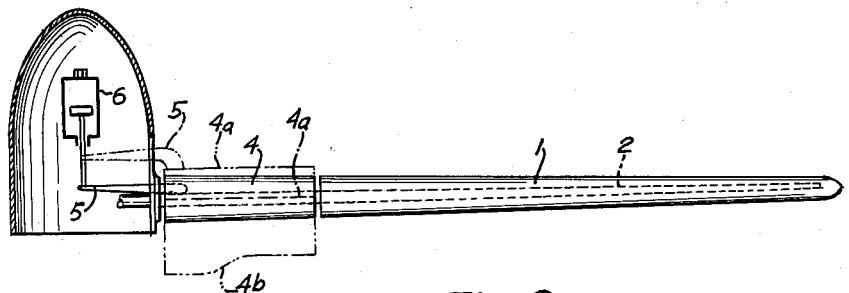
Figure 2 is a sectional plan showing the same propeller blade and hub.
Figure 3:
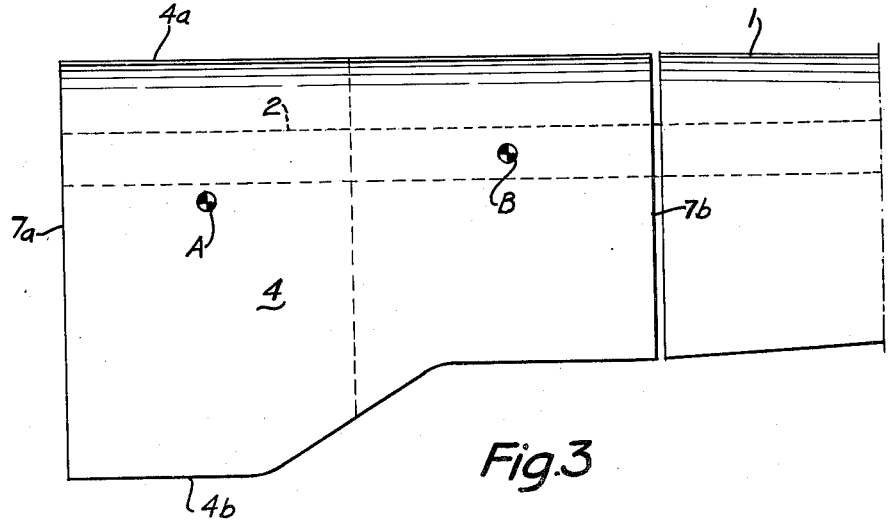
Figure 3 shows on a larger scale, a portion of a propeller blade, illustrating the various positions of the center of pressure, at successive portions of the rotary inner blade portion or envelope.

This streamlined rotatable portion of the propeller has a forward leading edge 4a formed by the points on said envelope 4 being most advanced on the envelope 4 in the direction of the rotary movement of the propeller blade. This direction of movement is indicated by arrows in Figures 1, 4 and 5. This leading edge line is indicated by a dash-and-dotted line in Figures 2 and 5. The largest diameter of the cross section of the streamlined portion is indicated at 7a on the end surface of the portion facing the hub (a dotted line indicating 7a in Figure 5) and at 7b on the end surface of the portion facing the propeller tip (a dash-and-dotted line at 7b in Figure 5). The curved trailing edge, i.e. the edge to the rear in the direction of the rotary movement of the propeller is indicated at 4b. Due to the fact that diameter 7a is larger than diameter 7b, and that the trailing edge 4b is given a flattened S-curved shape, the rotary portion of the propeller has its center of pressure A, at least as far as the zone directly adjacent the hub is concerned, disposed behind the axis of the shaft 2, while for the remaining portion the center of pressure B is located on such axis.

The envelope 4 is connected through a lever 5, to damping means 6 arranged within the hub 3 and common to the freely rotatable envelopes of all the blades of the propeller, such damping means operating to effectively damp the angular movements and therefore to prevent fluttering of said envelopes.

In Figure 4 each of the rotary blade portions 4 is damped individually by its damping cylinder 6, while in Figure 5 all rotary blade portions are damped simultaneously by the damping cylinder 6 centrally mounted on top of the hub body 3.

The actual means for effecting cyclic and collective pitch variation of the tip portions 1 of the propeller blades, i.e. rotation of the shaft 2 by a certain angle, does not constitute a part of the present invention, but shall be briefly explained to facilitate the understanding of the nature of my invention.

In a manner known per se such partial rotation of the shaft 2 and therefore of the blade is caused by bodily raising or lowering the ring 8 for collective pitch variation and by tilting the ring about a line through its center for effecting cyclic pitch variation, the displacements of the ring being transmitted to the axes 2 of the blades by the link members 9 pivotally mounted on the upper face of the ring 8 at their one end and pivotally connected at their upper end to a crank 10 mounted at the end of the shaft 2 as shown in Figures 4 and 5. As an example of a blade adjusting means of this kind reference is made to the U.S. Patent 2,439,089 and to my copending application 411,501 filed February 19, 1954, now abandoned.

It will be understood that this invention is susceptible to modification in order to adapt it to different usages and conditions, and, accordingly, it is desired to comprehend such modifications within this invention as may fall within the scope of the appended claims.

What I claim is:

1. An aircraft propeller for use in a combined helicopter-flying machine, and consisting of a central hub and a plurality of blades each of which is mounted rotatably around a longitudinally rotary axis on said hub for adjustment of its pitch, each of said blades comprising a tip portion adapted for controlled rotation around said longitudinal axis, and an inner portion adjacent said hub, said inner portion being free to pivot about said longitudinal axis, said inner portion having an airfoil cross section and having a leading and a trailing edge in relation to the rotary movement of said blade around said hub, the distance from said leading edge to said longitudinal axis being substantially the same throughout the length of said inner portion, a first end surface facing said tip, and a second end surface facing said hub, the distance between said trailing edge and said longitudinal rotary axis at said second end surface being larger than the distance therebetween at said first end surface so as to locate the center of pressure for a part of said inner portion behind said longitudinal rotary axis relative to the direction of rotary movement of said blade so that the inner portion will produce some lift.

2. An aircraft propeller for use in a combined helicopter-flying machine, and consisting of a central hub and a plurality of blades each of which is mounted rotatably around a longitudinal rotary axis on said hub for adjustment of its pitch, each of said blades comprising a tip portion adapted for controlled rotation around said longitudinal axis, and an inner portion adjacent said hub, said inner portion being free to pivot about said longitudinal axis, said inner portion having an airfoil cross section and having a leading and a trailing edge in relation to the rotary movement of said blade around said hub, the distance from said leading edge to said longitudinal axis being substantially the same throughout the length of said inner portion, a first end surface facing said tip, and a second end surface facing said hub, the distance between said trailing edge and said longitudinal rotary axis at said second end surface being larger than the distance therebetween at said first end surface so as to locate the center of pressure for at least part of said inner portion behind said longitudinal rotary axis relative to the direction of rotary movement of said blade, said trailing edge forming a flat S-shaped curve between said first and second end surface, so as to locate the center of pressure for part of said inner portion behind said longitudinal axis relative to the direction of rotation of said blade, while the center of pressure of the remaining part of said inner portion is located substantially on said longitudinal axis.

3. An aircraft propeller for use in a combined helicopter-flying machine, and consisting of a central hub and a plurality of blades each of which is mounted rotatably around a longitudinal rotary axis on said hub for adjustment of its pitch, each of said blades comprising a tip portion adapted for controlled rotation around said longitudinal axis, and an inner portion adjacent said hub, said inner portion being free to pivot about said longitudinal axis, said inner portion having an airfoil cross section and having a leading and a trailing edge in relation to the rotary movement of said blade around said hub, the distance from said leading edge to said longitudinal axis being substantially the same throughout the length of said inner portion, a first end surface facing said tip and a second end surface facing said hub, the distance between said trailing edge and said longitudinal rotary axis at said second end surface being larger than the distance therebetween at said first end surface, whereby said trailing edge forms a flat S-shaped curve between said first and second end surface, so as to locate the center of pressure for part of said inner portion behind said longitudinal axis relative to the direction of rotation of said blade, while the center of pressure of the remaining part of said inner portion is located substantially on said longitudinal axis, and means being provided for damping the free angular movements of such portions to prevent fluttering thereof.

4. A propeller blade in an aircraft propeller for use in a combined helicopter-flying machine, and consisting of a central hub and a plurality of blades each of which is mounted rotatably around a longitudinal rotary axis on said hub for adjustment of its pitch, said blade comprising a tip portion adapted for controlled rotation around said longitudinal axis, and an inner portion adjacent said hub, said inner portion being free to pivot about said longitudinal axis, said inner portion having an airfoil cross secton and having a leading and a trailing edge in relation to the rotary movement of said blade around said hub, the distance from said leading edge to said longitudinal axis being substantially the same throughout the length of said inner portion, a first end surface facing said tip, and a second end surface facing said hub, the distance between said trailing edge and said longitudinal rotary axis at said second end surface being larger than the distance therebetween at said first end surface so as to locate the center of pressure for at least part of said inner portion behind said longitudinal rotary axis relative to the direction of rotary movement of said blade, said trailing edge forming a flat S-shaped curve between said first and second end surface thereby extending part of said inner portion so far to the rear from said longitudinal axis as to locate the center of pressure for part of said inner portion behind said longitudinal axis relative to the direction of rotation of said blade, while the center of pressure of the remaining part of said inner portion is located substantially on said longitudinal axis.

References Cited in the file of this patent
UNITED STATES PATENTS
2,693,241      Ranson _____ Nov. 2, 1954